United States Patent [19]
Dorfman

[11] Patent Number: 5,454,000
[45] Date of Patent: Sep. 26, 1995

[54] METHOD AND SYSTEM FOR AUTHENTICATING FILES

[75] Inventor: Barry L. Dorfman, Austin, Tex.

[73] Assignee: International Business Machines Corporation, Armonk, N.Y.

[21] Appl. No.: 912,428

[22] Filed: Jul. 13, 1992

[51] Int. Cl.⁶ .................................................. G06F 11/10
[52] U.S. Cl. ............................................................ 371/53
[58] Field of Search .................... 371/53, 54; 364/285.4, 364/283.1, 222.81, 962; 380/25

[56] References Cited

U.S. PATENT DOCUMENTS

| | | | |
|---|---|---|---|
| 4,984,272 | 1/1991 | McIlory | 380/25 |
| 5,050,212 | 9/1991 | Dyson | 380/25 |
| 5,121,397 | 6/1992 | Norrod | 371/54 |
| 5,161,163 | 11/1992 | Bossan et al. | 371/54 |
| 5,247,524 | 9/1993 | Callon | 371/53 |

OTHER PUBLICATIONS

Douglas Hartman, "Unclogging Distributed Computing", May, 1992, IEEE Spectrum, pp. 36–39.

*Primary Examiner*—Robert W. Beausoliel, Jr.
*Assistant Examiner*—Norman M. Wright
*Attorney, Agent, or Firm*—Casimer K. Salys

[57] ABSTRACT

A system and method for verifying the integrity of files, and in particular executable files on a server workstation in a distributed computing network. In one form, verification is accomplished by selecting random or pseudo-random sections of the file, both as to the location and size, and comparing check code results for those sections with corresponding calculations of check codes for a secure master file. In the context of a network, the objective is to verify the integrity of the executable file, typically located in as unsecure server computer, and once so verified transmit over a relatively secure communication network confidential data to be used by the executable file. The systems and methods for practicing the invention in a distributed computing network involving communication, using relative security protocols, between a dispatcher workstation and a server workstation and resources to generate and compare random or pseudo-random number pairs which define sections of the executable file subject to authentication. The comparison involves check code computations for the sections defined by the number pairs as appears in the server computer file as well as a master executable file in the dispatcher computer. A comparison of the check codes determines the integrity of the executable file in the server computer.

14 Claims, 4 Drawing Sheets

METHOD AND SYSTEM FOR AUTHENTICATING FILES

BACKGROUND OF THE INVENTION

The present invention generally relates to methods and systems which provide secure distributed computing. More particularly, the invention is directed to methods and systems for authenticating executable files which are situated on unsecure computer workstations but are connected through a relatively secure network.

The concept of distributed computing has become popular in recent times due, at least in part, to the combination of secure high-speed communication networks and exceptional computational resources in relatively small and inexpensive workstations and computers. This technology evolution has led to distributed computing environments in which the computational task is partitioned and then distributed to the diverse server computers or workstations in a network. The distributed computing environment has proven to be particularly suited to the needs of simulators given their prevailing practice of repeating the same simulation with a multitude of different parameter values or conditions. The distributed computing environment allows such simulations to be run in parallel, each workstation or server computer performing the simulation based upon the parameters assigned.

A commonly encountered problem with distributed computing networks arises from the physical dispersion of the workstations or computers, and the associated lack of physical and/or access security at such remote units.

Experience has established that the network communication media and workstation resident communication programs can be made relatively secure through the use of highly structured protocols and the control of the communication program source code. The problem arises from the common need to convey confidential information from a dispatcher workstation, at a secured location, to an unsecure server workstation or computer location, where the confidential information is to be used in executable files or application programs. Since the means of communication can be made relatively secure, the danger arises from the introduction of "trojan horse" files into executable files resident on the unsecure workstation or computer. Therefore, in the context of a moderately secure distributed computing environment, there exists a need for methods and systems which ensure that "trojan horse" contaminated versions of executable files as may reside on unsecure server workstation are not sent confidential information as a part of a task assigned to the server workstation.

SUMMARY OF THE INVENTION

The present invention defines systems and methods for authenticating files and, in another form, authenticating such executable files in a distributed computing network.

In its first aspect, the authentication of a file according to a preferred practice of the invention involves systems and methods for defining random sections of code within the selected file, evaluating check code characteristics for such defined random sections, and comparing such check code results with those for a corresponding set of sections from a master copy of the file.

In its second aspect, the invention involves systems and methods for authenticating executable files in a distributed computing network having a relatively secure communication media between a dispatcher workstation and a server workstation or computer in the network. Check codes are determined for random sections within the executable file at the server workstation, and through the secure means of communication are compared to check codes for corresponding sections in a master copy of the executable file as exists in the dispatcher workstation. The correspondence of the check codes suggests integrity of the server resident executable file and reasonable basis for conveying any confidential information needed by the executable file.

These and other aspects of the invention will be appreciated and understood to a greater extent upon considering the detailed description which follows.

DESCRIPTION OF THE PREFERRED EMBODIMENT

Figure 1:
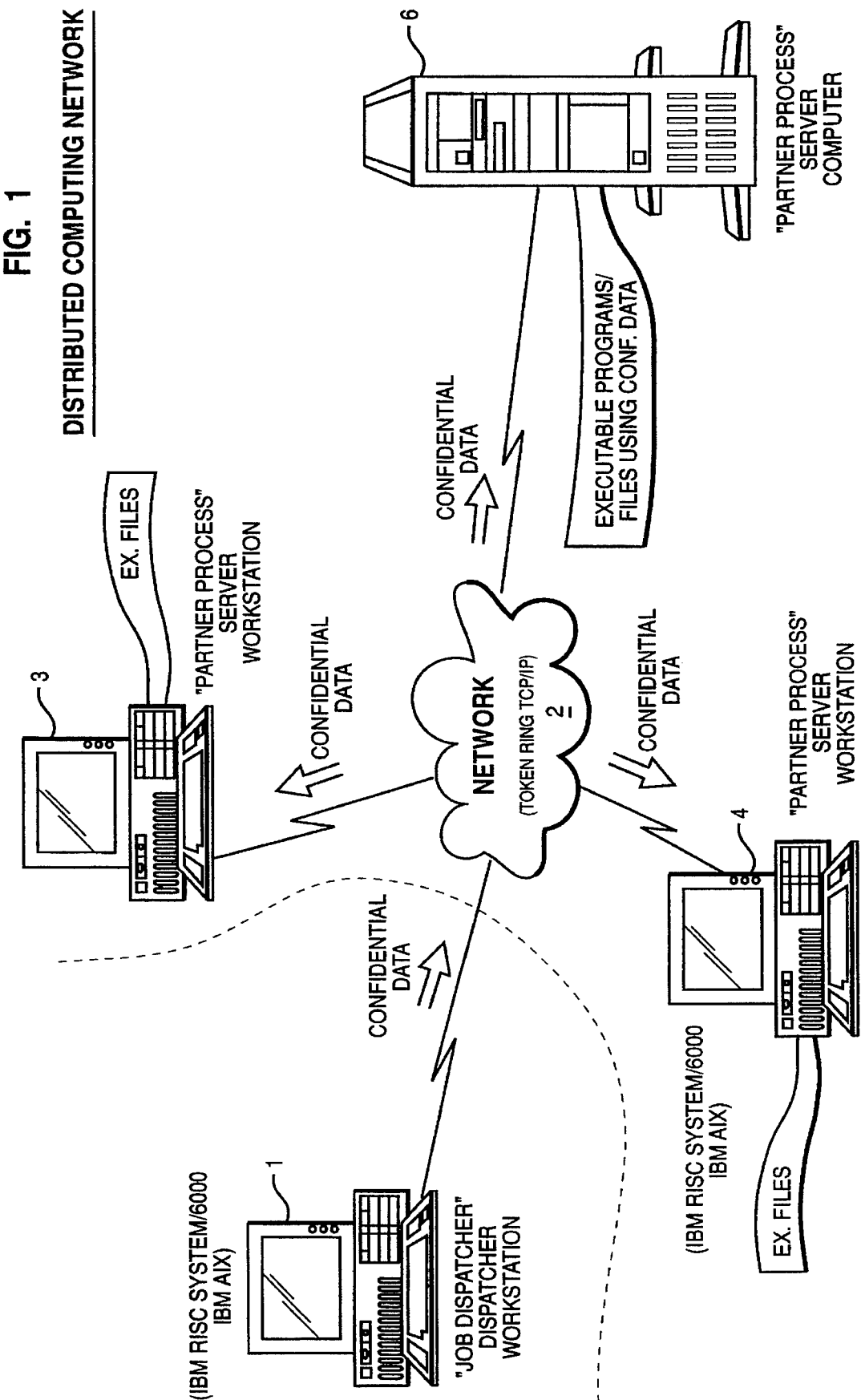
FIG. 1 is a schematic diagram of a distributed computing network.

A distributed computing network of the form to which the present invention relates is schematically depicted in FIG. 1. As shown in the figure, dispatcher workstation 1 is connected through network 2 to a number of server workstations or computers 3, 4 and 6. The servers 3, 4 and 6 are presumed by virtue of physical location or access control not to be secure. Each server includes executable application programs or files, for example simulation programs stored on hard disk, which are locally executable using confidential data furnished by dispatcher workstation 1. Each server 3, 4 and 6 also includes a "partner process" program, which program controls the communication between the server and the network. The goal is to perform distributed computing using dispatcher sourced confidential information at unsecure remote server workstations and computers without compromising the security of that information. As is undoubtedly apparent, the distributed computing network does not contemplate an absolute level of security. The goal is to acquire the benefits of distributed computing while providing reasonable security over information being distributed to perform the computation.

A preferred implementation of the network depicted in FIG. 1 utilizes IBM RISC System/6000 workstations for the functions of the dispatcher and server workstations and computers, operating under the IBM AIX operating system. The network is preferably a token ring configured to run TCP/IP communication software. The "job dispatcher" communication code executes as an AIX application program at the dispatcher workstation. The complementing "partner processes" are AIX application programs situated on each of the server workstations and computers in the network. Representative executable files are simulations whose parameters or characteristics are defined by confidential data transmitted over the network.

The security exposure for the distributed computing network depicted in FIG. 1 arises primarily from the potential compromise of an executable file, for example by the inclusion of a "trojan horse" file. Investigations have established that reasonable levels of communication security can be obtained through the creation of complex protocols involving the job dispatcher code and partner process code. On the other hand, the executable programs or files can be readily altered to satisfy classical security check code techniques such as cyclic redundancy count (CRC), check-sum or one-way hash analysis.

The present invention has two aspects. First, it provides a system and method for detecting altered files. Secondly, it provides a system and method for verifying files within the context of a distributed computing network of access unsecure server workstations and computers.

Figure 2:
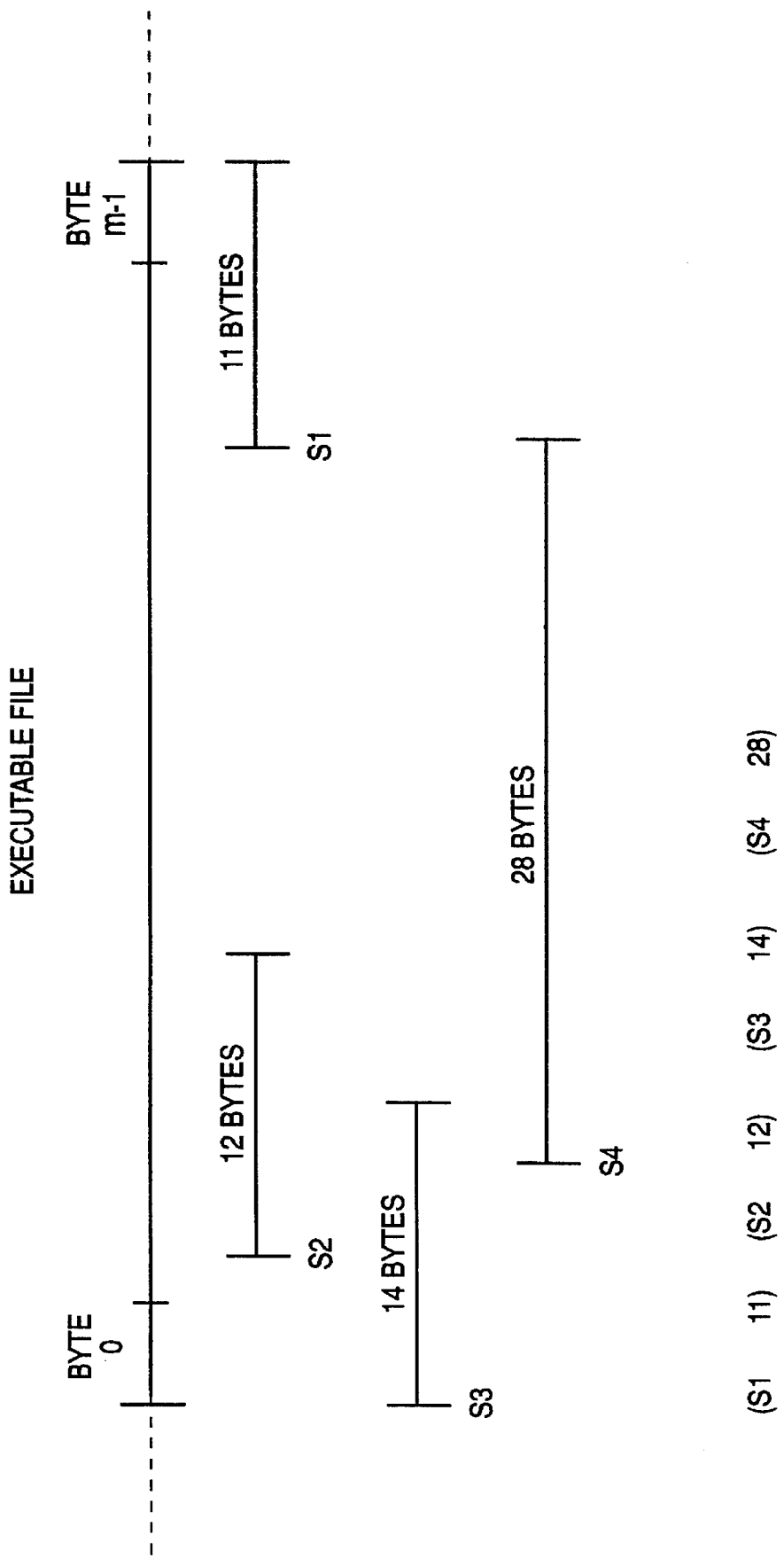
FIG. 2 is a schematic diagram of selected random sections within an executable file.

File integrity is verified using the procedural implementation schematically depicted in FIG. 2. As illustrated in the figure, a file extends from byte 0 to byte m-1. The file verification, such as a match with a master file, is accomplished by defining a multiplicity of randomly situated and sized file segments. A "check code" operation is performed on each file segment and then compared to corresponding sections in the master copy of the file. Each evaluation uses a new and pseudo-randomly selected set of sections from the file.

A preferred implementation of the operation depicted in FIG. 2 involves the pseudo-random selection of number pairs which define each section. Preferably, the first number defines the starting byte position while the second number defines the size of the section selected. The preferred implementation biases the randomness of the selection to insure that the file is completely covered and that multiples of the sections overlap. Classical "check code" calculations, such as "cyclic redundancy count" or "check-sum" are then applied to each section.

In the context of the example file depicted in FIG. 2, the m byte size file is verified through the use of four verify number pairs pseudo-randomly selected both in starting position and byte size. The starting position S1 is randomly selected, as is the 11 representing the size of this section. Check code analysis follows.

Comprehensive verification of the file in FIG. 2, according to the preferred practice of the invention, involves a preliminary reading of the name, size and last modification time stamp of the whole executable file. Such initial screening is followed by check-sum or cyclic redundancy count comparisons of the bytes in the sections defined by the four verify number pairs.

File verification of the type described with reference to FIG. 2 is particularly valuable in FIG. 1 type networks, where a dispatcher workstation 1, at a secure location, is executing a "job dispatcher" communication program to enable one or more server workstations or computers executing complementary "partner process" communication programs to transmit confidential data over the network. The communication between the "job dispatcher" process and the "partner processes" is presumed to be acceptably secure from the intricacies of the protocol. The problem is one of verifying the integrity of the executable files at the server workstations and computers to insure that one or more "trojan horse" files have not been inserted for intercepting confidential data subject to processing.

Figure 3:
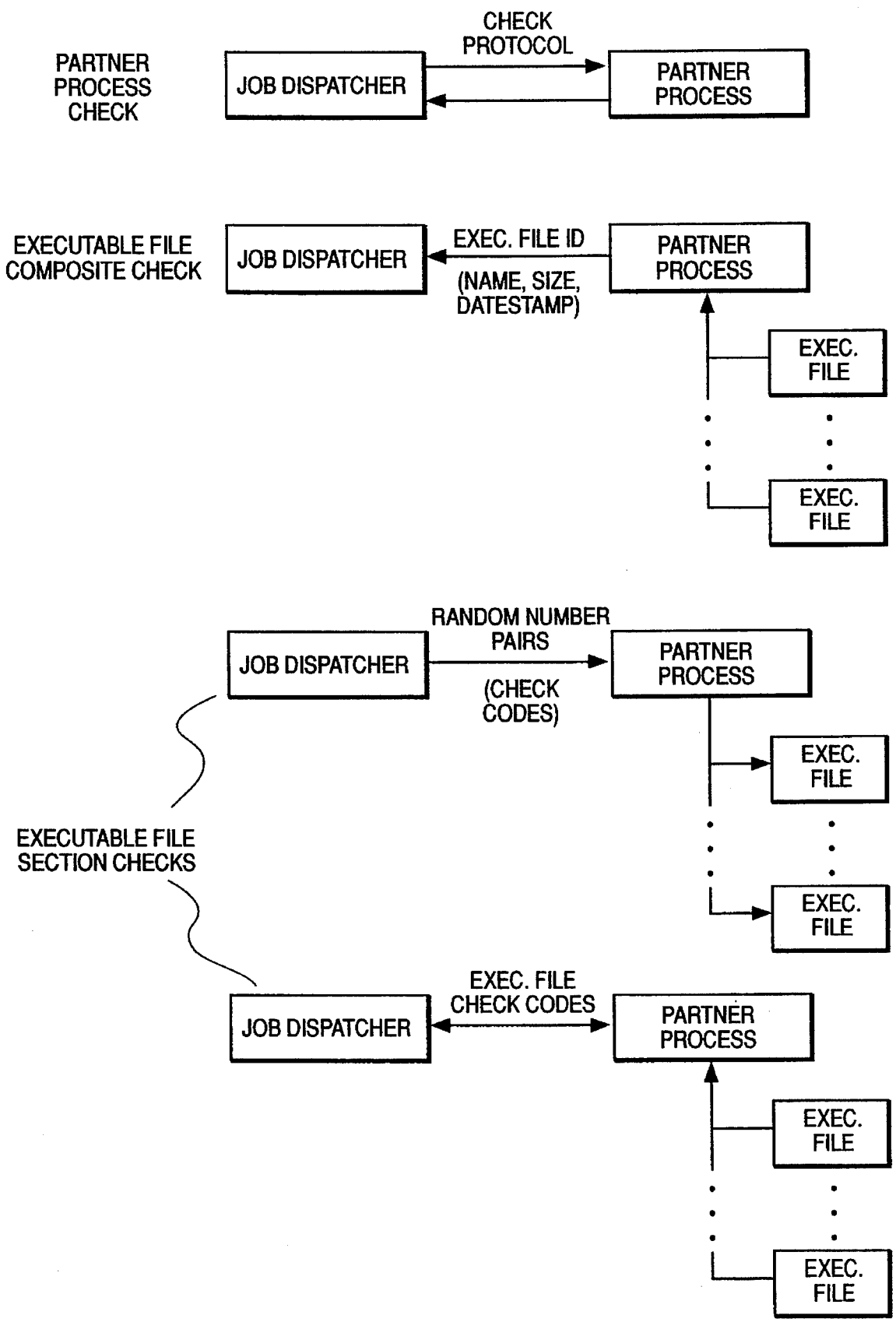
FIG. 3 is a schematic functionally depicting the sequence of operations in a distributed computing network.

The preferred solution according to the present invention is functionally defined in FIG. 3. As shown, the communication commences with a partner process check through the verification of the communication protocol between the job dispatcher and the partner process. As noted earlier, the protocol is presumed to provide a level of security consistent with the overall objectives.

The next step is to perform a quick check of the executable file as a whole. This operation is considered optional in that it merely confirms parameters such as name, size and date stamp of the executable file. The job dispatcher compares the information with similar information taken from a master copy of each executable file. Any unintentional changes to the file would be detected as discrepancies during this first level of evaluation. Such a check is considered an efficient utilization of computer and communication network time in preparation for more extensive verification.

The next stage in the composite verification involves the selection and exchange of verification number pairs between the job dispatcher and partner process. Either the job dispatcher or partner process can initiate this step. However, if the earlier noted optional step is not performed, the selection and exchange of number pairs must be initiated by the partner process in that the partner process has the information about what executable will be used next. On the other hand, if the optional step was performed, then both the job dispatcher and partner process know that the selection and exchange of verification numbers follows as the next step. Thus, either the job dispatcher or partner process can initiate the communication.

The depiction in FIG. 3 presumes that the selection of the random or pseudo-random number pairs is initiated by the job dispatcher. Once the verify number pairs are selected, the job dispatcher generates a check code for each of the sections of the file defined by the number pairs using a master copy of the file undergoing verification. The check code numbers are generated so that they can be compared at a later step. The method used to generate the check code number is not of consequence to the invention, given that there are numerous methods known, including the aforementioned check-sum and cyclic redundancy count techniques. What is important is that each of these check code calculations are performed independently for each section of the file defined by the pseudo-randomly selected number pairs. Thus, each section is treated as a complete file for purposes of the calculation. In the case of the example depicted in FIG. 2, there are four sets of number pairs and a corresponding set of four check code values.

In keeping with the implementation in FIG. 3, the number pairs and associated master file derived check codes are communicated to the partner process. The partner process then generates a corresponding set of check codes using the sections of the file defined by the number pairs. The check codes transmitted to the partner process are then compared to the check codes derived for the executable file at the server workstation or computer. If any one of the check codes does not match, then the partner process initiates an error sequence involving for example, a notice to the job dispatcher process that a mismatch was detected, or in some cases initiating the installation of a different file at the partner process followed by a repeat of the calculation and comparison.

Alternate practices of the invention are feasible. In one such practice, the random number pairs are conveyed from the job dispatcher to the partner process, the partner process calculates the check code numbers associated with the executable file, and the check code numbers are returned to the job dispatcher for final verification comparison. The disadvantage of this sequence arises from the additional communication necessary to inform the partner process about the success or failure of the comparison. Namely, if the comparison is performed in the partner process, execution of the file can commence immediately following the comparison. On the other hand, if the comparison is performed in the job dispatcher, not only do the check codes have to be transmitted to the job dispatcher process, but the job dispatcher process must initiate a further transmission back to the partner process to commence the execution of the file.

The transmission of confidential information from the dispatcher workstation to the server workstation or computer, in keeping of the protocol communication between the job dispatcher and the partner process, follows as needed during the running of each executable file.

Figure 4:
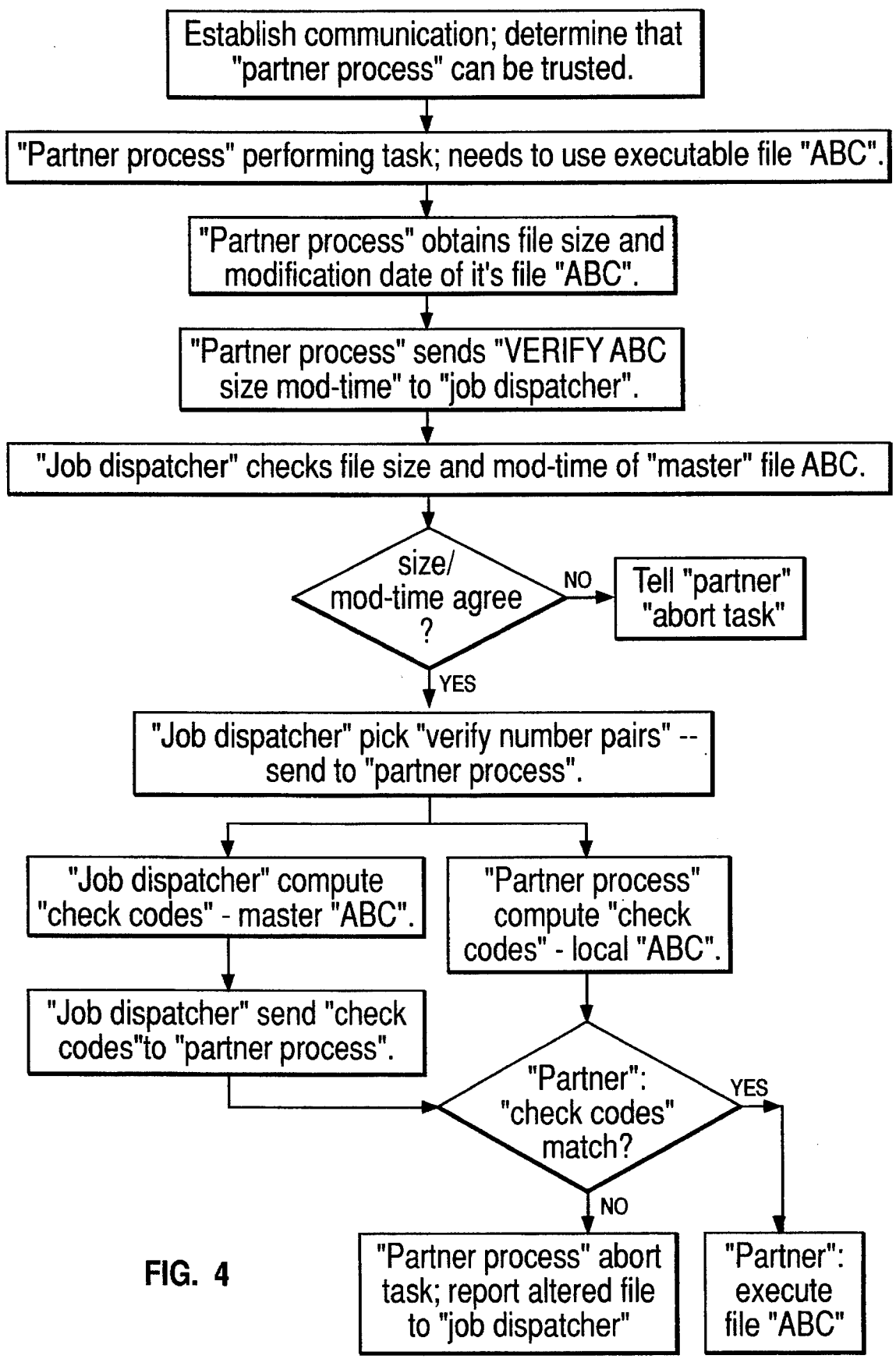
FIG. 4 is a diagram of the process for verifying executable file integrity in a distributed computing network.

FIG. 4 presents by flow diagram the steps associated with the practice of the present invention in the verification of a file "ABC". The flow diagram in FIG. 4 depicts both embodiments of check code comparison, where the location of the comparison is as noted earlier a matter of timing preference.

The systems and methods defined by the present invention provide the structure and operations for verifying files individually or in the context of a distributed computing network. Reasonable confidence in the verification is provided by the use of a master file as a comparison base and the implication of randomness in the selection of the file sections to be compared. Furthermore, the random nature of the number pairs selected for check code calculations relates both to the starting position and to the size of the file sections subject to comparison. The pseudo-random bias of having the file sections overlap and cover the whole of the executable file further complicates any attempt to introduce a "trojan horse" into the file.

Although the invention has been described and illustrated by way of specific embodiments, the systems and methods encompassed by the invention should be interpreted consistent with the breadth of the claims set forth hereinafter.

I claim:

1. In a computer system having a processor and memory, a system for authenticating a file stored in memory with the processor, comprising:

means for the processor to define random or pseudo-random sections within the file;

means for the processor to generate check codes for the defined random or pseudo-random section of the file; and means for the processor to compare generated check codes of the file with check codes for corresponding sections in a master copy of the file to detect inconsistencies.

2. The system recited in claim 1, wherein the random or pseudo-random sections are defined by a section starting location and section size information.

3. The system recited in claim 2, wherein the sections are groupings of file bytes defined by a starting location and length in the file.

4. In a computer having a processor and memory, a method for authenticating a file stored in memory with the processor, comprising the steps of:

defining by the processor random or pseudo-random sections within the file;

generating by the processor check codes for the defined random of pseudo-random section of the file; and comparing by the processor the generated check codes of the file with check codes for corresponding sections in a master copy of the file to detect inconsistencies.

5. The method recited in claim 4, wherein the random or pseudo-random sections are defined by a section starting location and section size information.

6. The method recited in claim 5, wherein the sections are groupings of file bytes defined by a starting location and a length in the file.

7. In a network of computers having processors, memory and communication resources, a system for authenticating an executable file stored in a memory of the network, comprising:

means for establishing communication between a dispatcher computer and a server computer in the network;

means for defining random or pseudo-random sections within an executable file stored at the server computer;

means for the server computer to generate check codes for the defined random or pseudo-random section of the executable file at the server computer; and means for a computer of the network to compare the generated check codes of the executable file in the server computer with check codes for corresponding sections in a master copy of the executable file in the dispatcher computer to detect inconsistencies.

8. In the system recited in claim 7, wherein the communication is provided by a relatively secure link between a job dispatcher process executing on the dispatcher computer and a partner process executing on the server computer.

9. The system recited in claim 8, wherein the random or pseudo-random sections are defined by a section starting location and section size information.

10. The system recited in claim 9, wherein the sections are groupings of executable file bytes defined by a starting location and a length in the executable file.

11. In a network of computers having processors, memory and communication resources, a method for authenticating an executable file stored in a memory of the network, comprising the steps of:

establishing a communication between a dispatcher computer and a server computer in the network;

defining random or pseudo-random sections within an executable file stored at the server computer;

generating by the server computer check codes for the defined random or pseudo-random section of the executable file; and comparing in a computer of the network the generated check codes of the executable file in the server computer with check codes for corresponding sections in a master copy of the executable file stored in the dispatcher computer to detect inconsistencies.

12. The method recited in claim 11, wherein the communication is provided by a relatively secure link between a job dispatcher process executing on the dispatcher computer and a partner process executing in the server computer.

13. The method recited in claim 12, wherein the random or pseudo-random sections are defined by a section starting location and section size information.

14. The method recited in claim 13, wherein the sections are groupings of executable file bytes defined by a starting location and a length in the executable file.

* * * * *